US009343879B2

(12) United States Patent
Kuhn et al.

(10) Patent No.: US 9,343,879 B2
(45) Date of Patent: May 17, 2016

(54) CARRIER PLATFORM

(75) Inventors: German Kuhn, Erlangen (DE); Achim Von Seck, Wachenroth ot Weingartsgreuth (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 14/355,261

(22) PCT Filed: Oct. 31, 2011

(86) PCT No.: PCT/EP2011/069133
§ 371 (c)(1),
(2), (4) Date: Apr. 30, 2014

(87) PCT Pub. No.: WO2013/064167
PCT Pub. Date: May 10, 2013

(65) Prior Publication Data
US 2014/0284447 A1 Sep. 25, 2014

(51) Int. Cl.
*F16M 11/00* (2006.01)
*H02B 5/00* (2006.01)
*H02B 1/54* (2006.01)

(52) U.S. Cl.
CPC ... *H02B 5/00* (2013.01); *H02B 1/54* (2013.01)

(58) Field of Classification Search
CPC .................................. H02B 5/00; H02B 1/54
See application file for complete search history.

(56) References Cited

U.S. PATENT DOCUMENTS 2,756,952 A 7/1956 Gazley
3,265,934 A 8/1966 Cuttino
3,689,809 A 9/1972 McDonald et al.
3,921,039 A 11/1975 Robinson et al.
4,577,826 A 3/1986 Bergstrom et al.
8,302,670 B2 11/2012 Yang et al.
8,668,034 B2 * 3/2014 Baradat et al. ................. 180/8.5
2009/0244302 A1* 10/2009 Tsai ......................... 348/208.99
2010/0032543 A1* 2/2010 Van Der Tempel
                               et al. ............................ 248/550

(Continued)

FOREIGN PATENT DOCUMENTS

CN    102155516 A    8/2011
GB    11000123 A     1/1968
RU    2445426 C1     3/2012

OTHER PUBLICATIONS

"Nokian Capacitors: Series Capacitors"; Apr. 13, 2007, XP055031228, URL:www.nokiancapacitors.com, pp. 1-16; Apr. 13, 2007.

(Continued)

*Primary Examiner* — Amy Sterling
(74) *Attorney, Agent, or Firm* — Laurence Greenberg; Werner Stemer; Ralph Locher

(57) ABSTRACT

A device for carrying high-voltage equipment in an electrically-insulated manner includes electrically non-conductive support insulators that are configured for mounting a carrier platform, which receives the high-voltage equipment, on a foundation in an electrically-insulated manner. Each support insulator extends towards the foundation from a bearing connected to the carrier platform. In order to provide such a device which is cost-effective and easy to produce, two support insulators extend at an incline from each bearing and the two support insulators form an acute angle with respect to their shared bearing.

6 Claims, 3 Drawing Sheets

(56) References Cited

U.S. PATENT DOCUMENTS

2010/0312243 A1* 12/2010 Ross et al. .................. 606/56
2012/0180593 A1* 7/2012 Alet et al. ................. 74/490.07

OTHER PUBLICATIONS

"Facts—Solutions to optimise network performance"; Alstom, Sep. 1, 2010, XP050032469, URL:http://www.alstom.com/Global/Grid/Resources/Facts/Documents/FACTS Solutions to optimise network performance Brochure ENG.pdf.
"ABB: Series Compensation—Boosting transmission capacity"; Dec. 1, 2010, XP055031217, Västeras, Sweden, URL:http://www05.abb.com/global/scot/scot212.nsf/veritydisplay/837c056a6167747fc1256fda003b4d03/$file/A02-0135E_ELR.pdf.

* cited by examiner

PRIOR ART

CARRIER PLATFORM

BACKGROUND OF THE INVENTION

Field of the Invention

The invention relates to a device for carrying high-voltage equipment in an electrically insulated manner, having electrically non-conducting supporting insulators which are designed to elevate a carrier platform, which holds the high-voltage equipment, on a foundation in an electrically insulated manner, wherein each supporting insulator extends from a mount, which is connected to the carrier platform, to the foundation.

A device of this kind is already known in practice. So-called "Flexible AC Transmission Systems" (FACTS), such as installations for wattless power compensation for example, have high-voltage equipment which is elevated out in the open in an electrically insulated manner with the aid of a device of the generic type. The device which is already known has, for example, a platform which has an area of 40 m$^2$ and on which the high-voltage equipment is arranged. The high-voltage equipment is connected to a high-voltage line and therefore a high-voltage potential is likewise applied to said high-voltage equipment. Supporting insulators which are produced from an electrically insulating non-conducting material are used to hold the platform on the foundation, which is embedded in the ground, in an insulated manner. Supporting insulators are accordingly known. Materials for constructing said supporting insulators are the insulating materials which are conventional in high-voltage technology, such as ceramics, plastics, fiber-reinforced plastics or the like for example. In order to increase the creepage paths, the supporting insulators generally have external ribs which are formed, for example, by an external ceramic pipe or a casing which is composed of silicone. The supporting insulators, which are of one- or two-part design, generally extend from the foundation, which is arranged in the ground region, perpendicular to the carrier platform. The carrier platform is generally supported at eight different points. In order for the remaining supporting insulators to reliably absorb the load of the carrier platform in the event of fracture of one of the supporting insulators, the carrying structure which is formed from the supporting insulators generally has two groups of four which are situated one in the other and which are divided into two independent rings by bracing means comprising non-conducting ties. Furthermore, tension or compression insulators which run in an inclined manner or at an angle to the platform are also known in accordance with the prior art.

The device according to the prior art exhibits the disadvantage that it is material-intensive and can be produced only in a complicated manner. Assembly is also difficult on account of the large number of joints required.

BRIEF SUMMARY OF THE INVENTION

The object of the invention is therefore to provide a device of the kind cited in the introductory part which is cost-effective and can be produced in a simple manner.

The invention achieves this object in that two supporting insulators extend in an inclined manner from each mount, wherein the two said supporting insulators span an acute angle in relation to the common mount of said supporting insulators.

According to the invention, the supporting insulators do not extend perpendicularly, that is to say at a right angle to the ground, between the foundation and the carrier platform. Rather, the supporting carriers each assume a different inclined position in relation to the ground surface and the carrier platform which is held parallel to the ground surface. In this case, the supporting insulators are firmly connected to the carrier platform by the mounts. According to the invention, two supporting insulators extend from each mount to the foundation. In this case, the two supporting insulators which are connected to the same mount span an acute angle in relation to the common mount. In other words, the acute angle which is spanned by said supporting insulators is less than 90°. In other words, two supporting carriers are connected to one another to form a V shape. This ensures that the load of the carrier platform can be absorbed substantially by the other supporting insulator even in the event of fracture of one of the supporting insulators, said other supporting insulator being connected to the same amount as the damaged supporting insulator. The supporting insulators are advantageously of two-part design, wherein they have, in their center, a joint with which the two non-conducting and insulating parts of the supporting insulators are connected. The supporting insulators are expediently connected to the respective mount in an articulated manner. The device according to the invention can be easily designed and assembled. Furthermore, said device is cost-effective since only a limited number of supporting insulators are required.

The mounts are expediently arranged in a rotationally symmetrical or point-symmetrical manner, wherein the point of symmetry is arranged beneath the center of gravity of the carrier platform or the center of gravity of the carrier platform is situated on the axis of symmetry.

According to a preferred refinement of the invention, each supporting insulator extends in an inclined manner from the mount to the foundation.

According to a preferred refinement of the invention, each supporting insulator extends from the respective mount to a foundation bearing which can be fixedly connected to the foundation, wherein each foundation bearing is connected to two supporting insulators and said supporting insulators span an acute angle in relation to the common foundation bearing of said supporting insulators, so that a carrying structure is formed. As has already been stated further above, the carrying structure is of symmetrical design and is arranged centrally beneath the carrier platform. The entire carrying structure is of V-shaped design. In other words, each supporting carrier is connected to two further supporting carriers, in each case in a V shape. Four mounts and four foundation bearings are expediently provided. This number has proven particularly expedient since the resulting eight supporting insulators can reliably absorb the weight of carrier platforms, including the high-voltage equipment which is arranged on said platforms, which are customary in the field of high-voltage technology, wherein, at the same time, the number of supporting insulators is considerably reduced in relation to the devices which are already known.

The supporting insulators are advantageously braced to one another by means of electrically insulating ties. The ties are produced, for example, from glass fiber-reinforced plastic. Said ties support the carrying capacity of the carrying structure which is formed by the supporting insulators.

The supporting insulators are expediently equipped with retaining joints. Suitable retaining joints are, for example, conventional ball-and-socket joints.

Further expedient refinements and advantages of the invention are the subject matter of the following description of exemplary embodiments of the invention with reference to the figures of the drawing, in which identical reference symbols refer to identically acting components.

DESCRIPTION OF THE INVENTION

Figure 1:
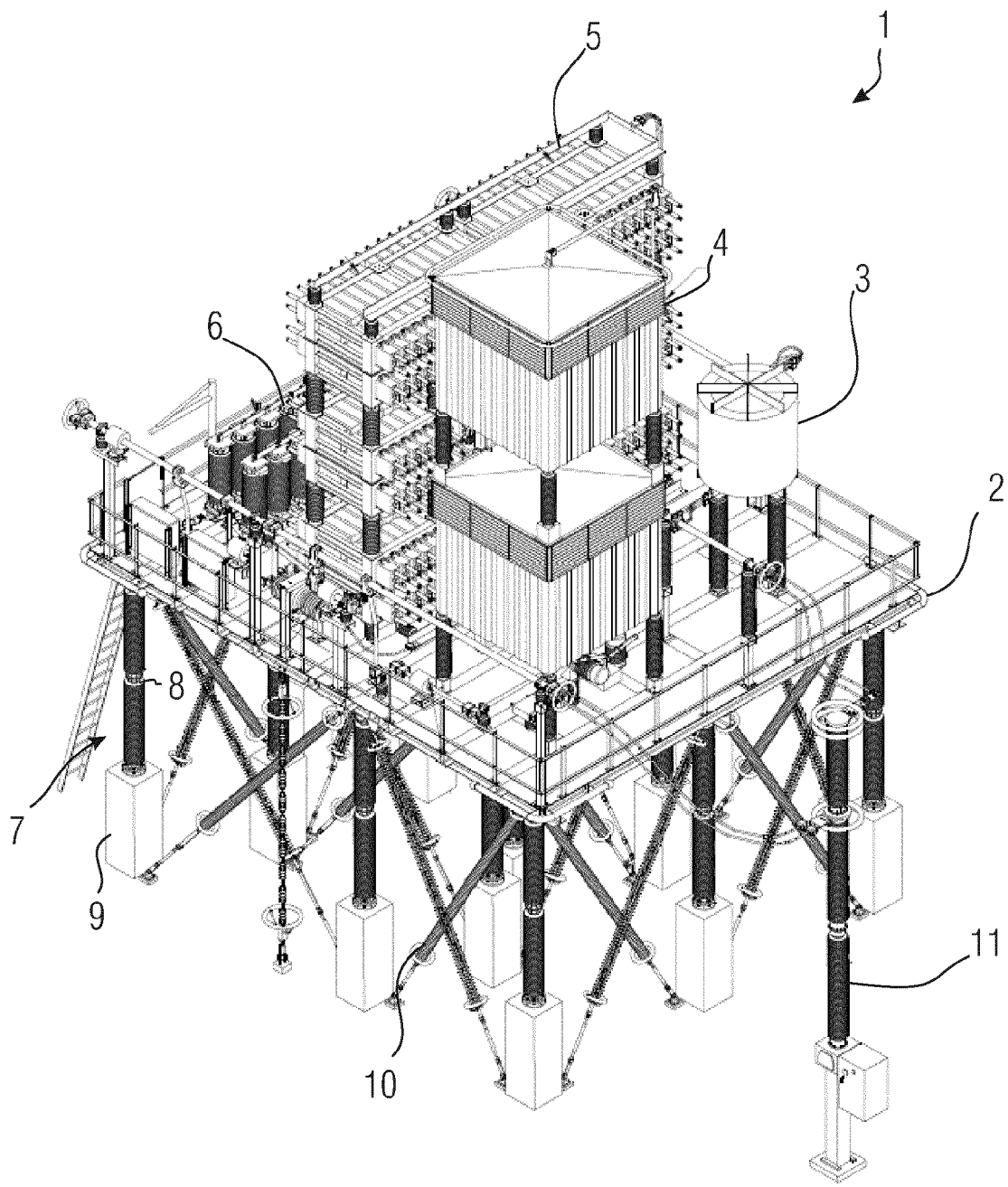
FIG. 1 shows a device according to the prior art.

FIG. 1 shows a device 1 according to the prior art. The device 1 has a carrier platform 2 which is oriented in a flat and horizontal manner. High-voltage equipment in the form of an inductor 3, a spark gap 4, a capacitor bank 5 and also in the form of outgoing conductors 6 is arranged on the carrier platform 2. During operation, a high-voltage potential, for example of 200 kV, is applied to said high-voltage equipment 3, 4, 5 and 6. The device further has supporting insulators 7 which are of two-part design and have a connecting joint 8. Each supporting insulator 7 extends perpendicularly from the carrier platform 2 to the respective foundation 9 which is embedded in the ground. In order to be able to reliably absorb the load of the carrier platform 2 when a supporting insulator 7 is fractured, external supporting insulators 7, that is to say supporting insulators 7 which are arranged in the edge region of the carrier platform 2, and also supporting insulators 7 which are situated further inside are provided. Tension/compression insulators 10 for stabilizing the device 1 are also shown. During normal operation, the entire weight of the high-voltage equipment 3, 4, 5, 6 of the carrier platform 2 is supported in a manner distributed over the supporting insulators 8. To this end, the supporting insulators 7 have a sufficiently high degree of stability. A high-voltage switch 11 is also shown.

Figure 2:
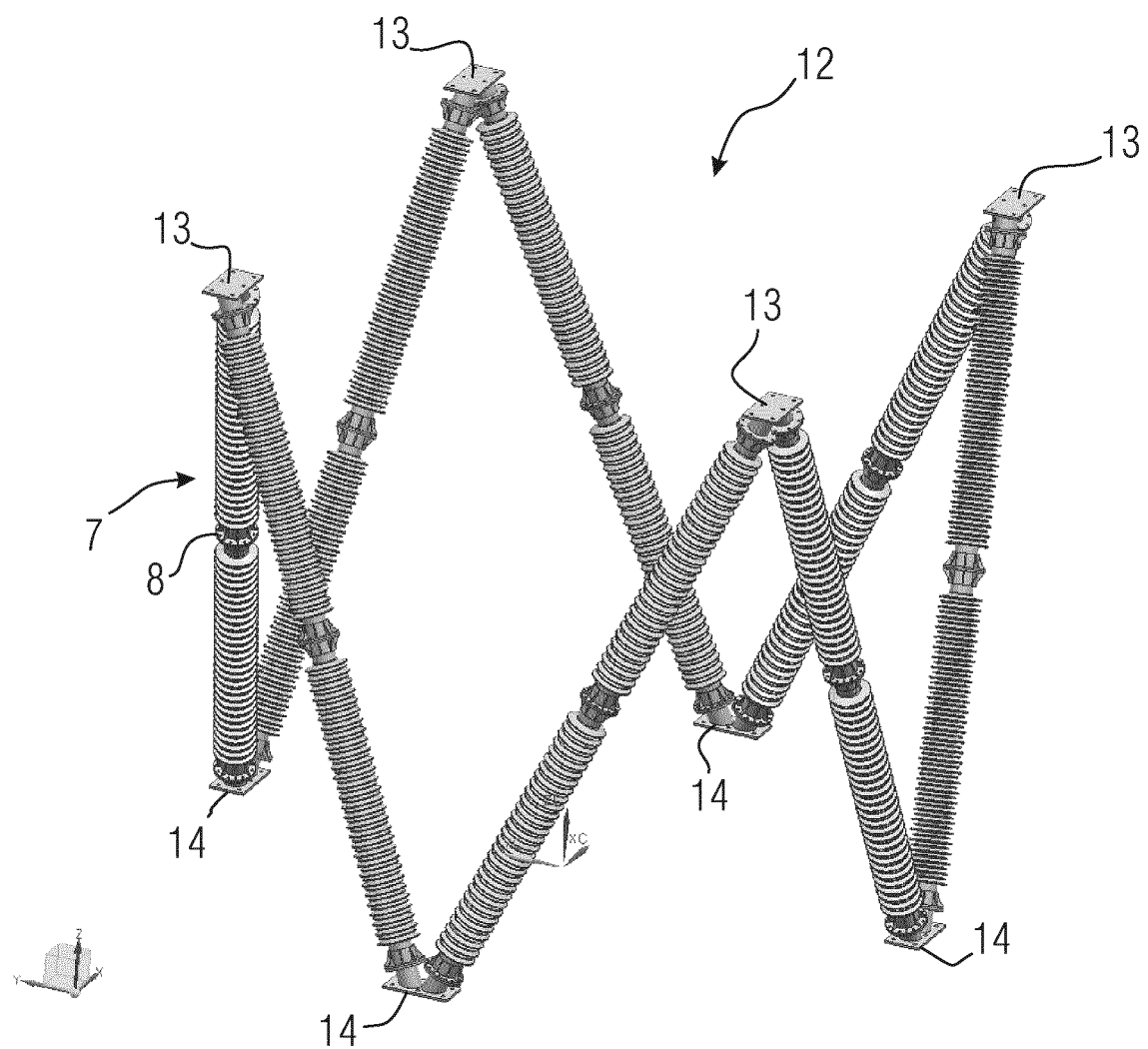
FIG. 2 shows a carrying structure for a device according to the invention.

FIG. 2 shows an exemplary embodiment of the carrying structure 12 of a device according to the invention. Said figure shows that the carrying structure 12 has eight supporting insulators 7 which are once again of two-part design, wherein a joint 8 connects the non-conducting non-conductive segments, which are provided with external ribs, to one another. Each supporting insulator 7 extends between a mount 13 and a foundation bearing 14. Each mount 13 is connected to two supporting insulators 7, wherein the supporting insulators 7, which are connected to the same mount, extend to different foundation bearings 14. In this case, two supporting insulators 7 which are connected to the same mount 13 span an acute angle in relation to the common mount 13. The same applies for two supporting insulators 7 which are connected to the same foundation bearing 14 and which likewise extend from this common foundation bearing 14 to different mounts, wherein said supporting insulators span an acute angle in relation to the common foundation bearing 14. The mounts 13 can be fixedly connected to the carrier platform 2, whereas the foundation bearings 14 can be connected to a foundation which is not illustrated in the figure. This ensures reliable, cost-effective and simple elevation of a carrier platform 2. The mounts 13 are arranged in a point-symmetrical manner in relation to one another in the exemplary embodiment which is shown in FIG. 2. Said mounts form the corners of a mount rectangle. The same applies for the foundation bearings 14, which can likewise be considered to be corners of a foundation rectangle, wherein the foundation rectangle is rotated through 45° in relation to the mount rectangle as viewed from above. The carrying structure 12 is likewise of symmetrical design overall and has an axis of rotation as the axis of symmetry which extends centrally and perpendicularly through the carrying structure 12. The axis of symmetry is not illustrated in the figure.

Figure 3:
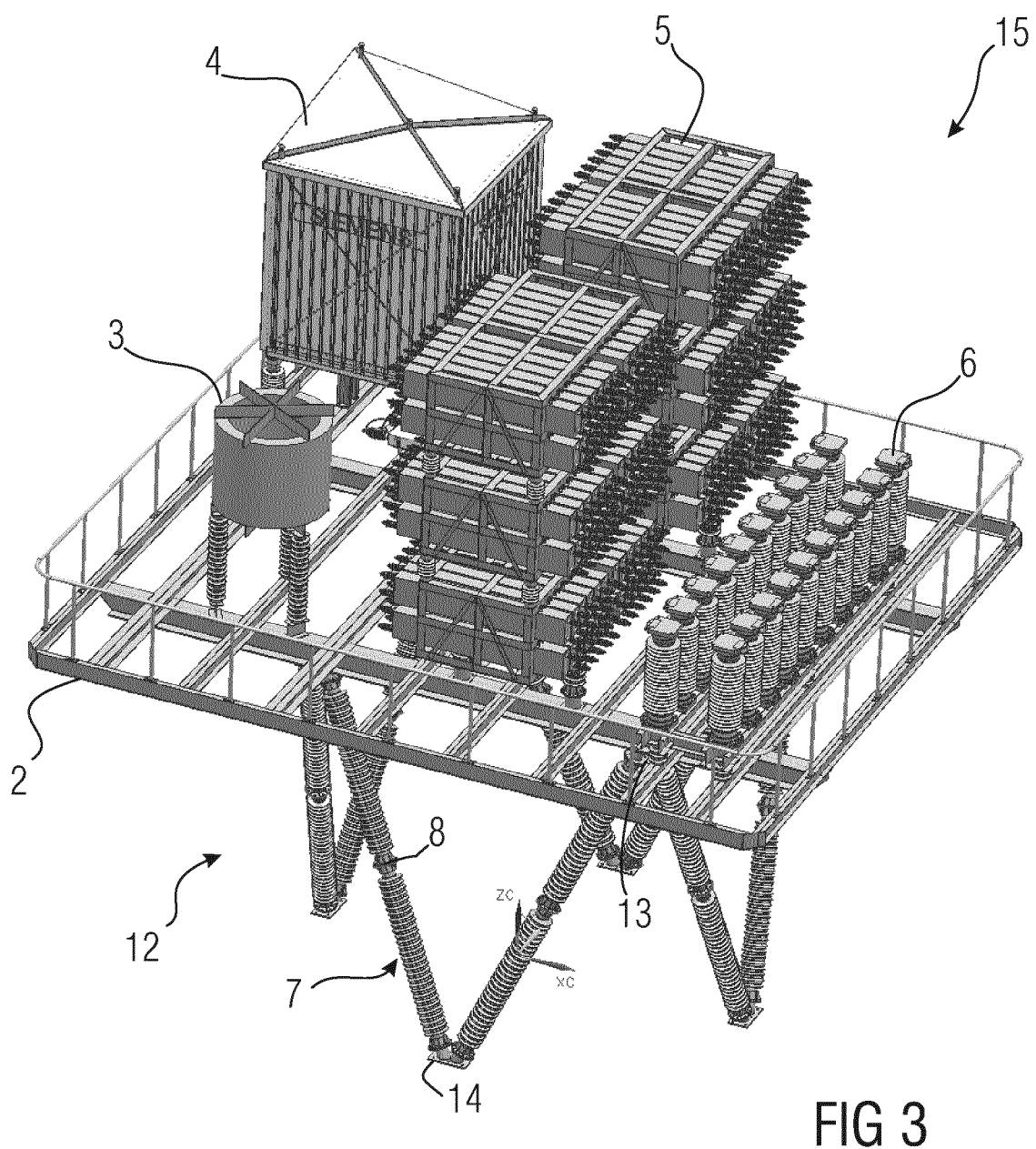
FIG. 3 shows an exemplary embodiment of the device according to the invention.

FIG. 3 shows an exemplary embodiment of the device 15 according to the invention. The device 15 again has a carrier platform 2 on which an inductor 3, a spark gap 4 and capacitor banks 5 are arranged as high-voltage equipment. Varistors 6 are also shown as such. The carrying structure 12 is arranged with its supporting insulators 7 centrally beneath the carrier platform 2. More precisely, the center of gravity of the carrier platform 2 lies on the axis of rotation of the carrying structure 12. Since in each case two supporting insulators 7 are connected to each mount 13 in an articulated manner, the load of the carrier platform 2 and the high-voltage equipment 3, 4, 5 and 6 can be reliably absorbed by the remaining supporting insulators 7 according to the invention even in the event of fracture of one of the supporting insulators 7.

The invention claimed is:

1. A device for carrying high-voltage equipment in an electrically insulated manner, the device comprising:
    a plurality of mounts to be connected to a carrier platform supporting the high-voltage equipment;
    a plurality of electrically non-conducting supporting insulators disposed to elevate the carrier platform electrically insulated, said supporting insulators having a fixed length and extending from a foundation to said mounts;
    two respective said supporting insulators extending from a respective said mount toward the foundation with an inclination and enclosing an acute angle therebetween and in relation to the common said mount;
    a plurality of foundation bearings to be fixedly connected to the foundation, and wherein each said supporting insulator extends from the respective said mount to a respective said foundation bearing, with each said foundation bearing having two supporting insulators connected thereto and said two supporting insulators spanning an acute angle in relation to the common said foundation bearing, to form a carrying structure.

2. The device according to claim 1, wherein each of said plurality of supporting insulators extends with an inclination from said mount to the foundation.

3. The device according to claim 1, wherein a number of said mounts is equal to a number of said foundation bearings.

4. The device according to claim 1, wherein said mounts are four mounts and said foundation bearings are four foundation bearings.

5. The device according to claim 1, wherein said supporting insulators are equipped with retaining joints.

6. The device according to claim 1, wherein said carrying structure is arranged centrally beneath said carrier platform, and said mounts lie in one plane and delimit an area that is smaller than an area of the carrier platform.

* * * * *